United States Patent [19]

McIntyre et al.

[11] Patent Number: 5,067,671
[45] Date of Patent: Nov. 26, 1991

[54] ANTI TIP-OFF EJECTION RAILS

[75] Inventors: Robert G. McIntyre, Manhattan Beach; Brad Mastrolia, Buena Park, both of Calif.

[73] Assignee: McDonnell Douglas Corporation, Long Beach, Calif.

[21] Appl. No.: 498,394

[22] Filed: Feb. 26, 1990

[51] Int. Cl.⁵ .................. B64D 11/06; B64D 11/112
[52] U.S. Cl. ........................... 244/122 AH; 244/122A
[58] Field of Search .... 244/122 A, 122 AH, 122 AB, 244/122 AC, 122 AD, 122 AE, 141

[56] References Cited

U.S. PATENT DOCUMENTS

| | | | |
|---|---|---|---|
| 2,569,638 | 10/1951 | Martin | 244/122 AE |
| 2,638,293 | 5/1953 | Lindstrom | 244/122 AE |
| 2,755,042 | 7/1956 | Paddon | 244/122 AC |
| 2,879,715 | 3/1959 | Bohlin | 244/122 AC |
| 3,130,947 | 4/1964 | Francis | 244/122 AC |
| 3,421,720 | 1/1969 | MacDonald, Jr. et al. | 244/122 R |
| 3,442,473 | 5/1969 | Rivedal et al. | 244/122 AB |

Primary Examiner—Joseph F. Peters, Jr.
Assistant Examiner—Virna Lissi Mojiea
Attorney, Agent, or Firm—Donald E. Stout; Gregory A. Cone; John P. Scholl

[57] ABSTRACT

Ejection seat rails that guide an ejection seat out of a vehicle, wherein the seat has rollers that travel along the rails. The rails are constructed such that the rollers simultaneously disengage from the rails, reducing the amount of tip-off that would occur if the rollers were to sequentially disengage.

16 Claims, 3 Drawing Sheets

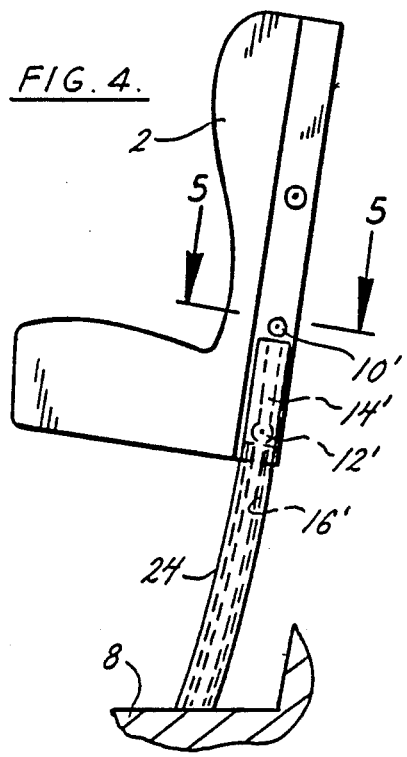
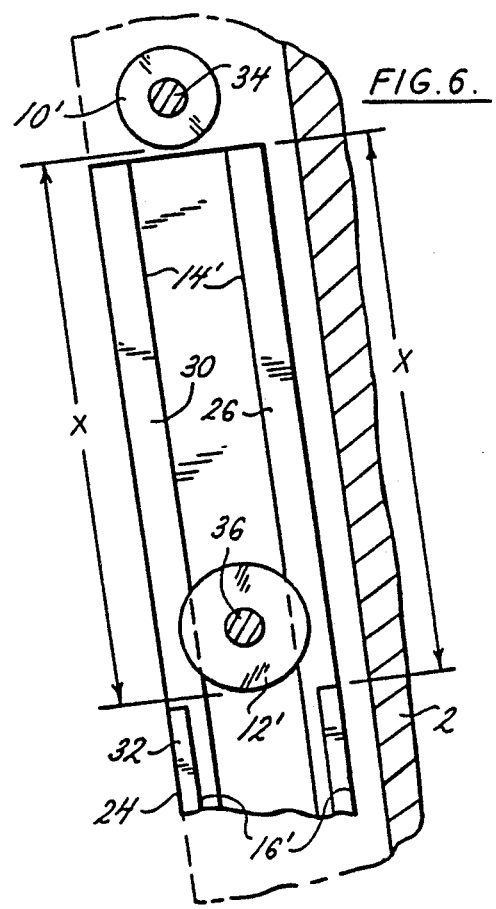
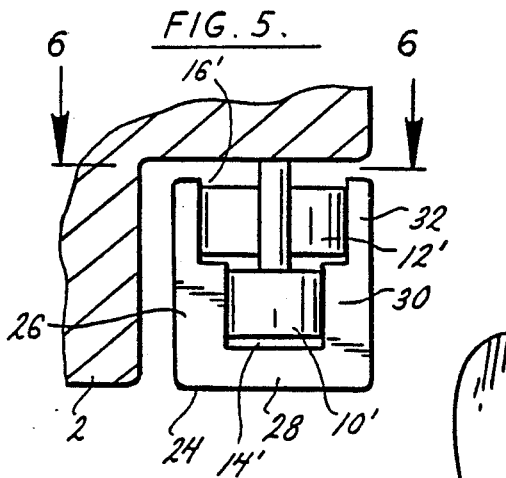
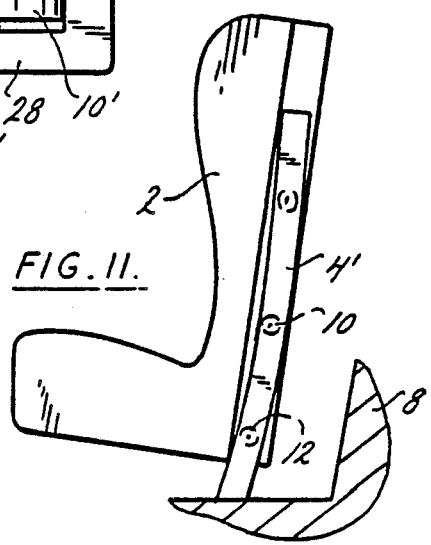
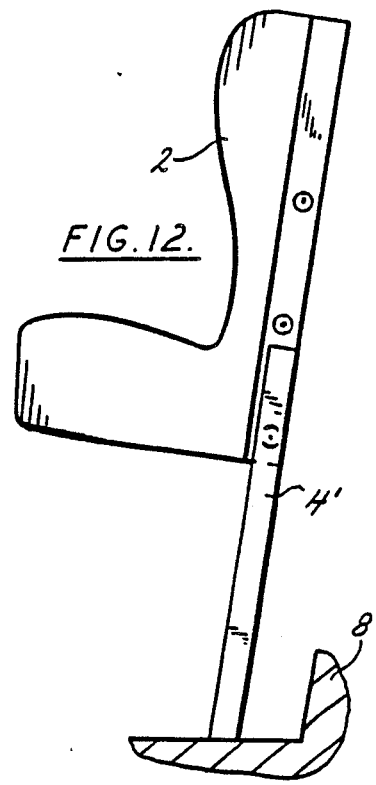

ANTI TIP-OFF EJECTION RAILS

BACKGROUND OF THE INVENTION

To direct an ejection seat out of a vehicle, it is common practice to guide the seat out of the cockpit with a pair of guide rails. Typically, the seat will have two or three rollers on each side, wherein each set of rollers travels along a single channel in the corresponding rail. Each side of the seat usually having a roller at the bottom, one in the middle and one near the top. As the seat travels up the rails, the seat reaches a point where the top and middle rollers have disengaged from the rail but the bottom rollers are still constrained by the rails. During this interval, the windblast will push the top of the seat aft of the vehicle while the rail constrains the bottom of the vehicle, producing a rotational moment on the seat and causing an undesirable aft pitch angle.

In addition, as the seat emerges from the vehicle, the rails bend due to the force of the windblast on the seat. This causes a further deviation in the pitch angle. One possible way to prevent rail bending would be to add structural support to the rails, but this would add weight and possibly create visual and spatial obstruction.

Thus what is needed, is an ejection seat rail that simultaneously releases the seat rollers and can compensate for any rail bending, such that the rails direct the ejection seat out of the vehicle at a desirable pitch angle.

SUMMARY OF INVENTION

This invention is an ejection seat rail that simultaneously releases the rollers of an ejection seat. Each rail has two separate channels, a first channel guides the top and middle rollers and a second channel directs the bottom roller. The second channel terminates at a distance from the first channel, equal to the distance between the bottom and middle rollers, such that the bottom roller is released from the second channel at the same time that the middle roller exits the first channel. This simultaneous release of the rollers eliminates the introduction of any rotational moment or deviated aft pitch angle on the seat as it exits the cockpit.

In an alternative embodiment, the seat guidance structure comprises at least one first guide attached to the ejection seat, at least one lever pivotally connected to the seat, and at least one second guide connected to said lever, the second guide being in close proximity to the first guide. At least one third guide is pivotally connected to the lever. One or more rails are attached to the aircraft, each rail having a single channel. The first, second, and third guides reside within the single channel and are adapted to travel along and exit from the single channel. The lever is of such a width and is attached to the ejection seat at such a distance from the second and third guides that when the first and second guides exit from the channel the ejection seat is totally released from the rail, even though the third guide is still in the channel. The second guide may be either a pair of rollers or a pair of flanges extending from the lever and contiguous to the rail while the flanges reside within the single channel. Furthermore, the rail may have a curvature along the longitudinal axis of the rail, which may be approximately five degrees.

The rails may also have a curvature so that when the beam bends during seat ejection, the beam will bend toward a more linear position, reducing or eliminating the amount of aft pitch caused by rail deflection.

Therefore it is an object of this invention to provide a rail for an ejection seat that simultaneously releases the seat rollers.

It is also an object of this invention to provide a rail that offsets beam deflection that occurs when the seat travels up the rail and is subjected to aerodynamic drag.

It is an object of this invention to provide a guide rail that simultaneously releases seat rollers, that is simple, lightweight and can be easily retrofitted into existing cockpits.

DETAILED DESCRIPTION OF THE DRAWINGS

The object of this invention and its advantages will become more apparent to those skilled in the art after further review of the specification and the drawings, wherein:

FIG. 4 is a side view of an ejection seat traveling up a rail constructed from a stepped "C" channel, wherein the seat rollers are releasing from the rail;

FIG. 5 is a cross-sectional view of FIG. 4 taken at line 5—5 showing the rollers within the first and second channels of the stepped "C" rail;

FIG. 6 is a cross-sectional view of FIG. 5 taken at line 6—6, showing the rollers of an ejection seat simultaneously releasing from the stepped "C" rail;

FIG. 11 is a side view of an ejection seat at rest in a curved rail;

FIG. 12 is a side view of an ejection seat releasing from the end of the rail, wherein rail has deflected to a linear position.

DETAILED DESCRIPTION OF THE INVENTION

Figure 1:
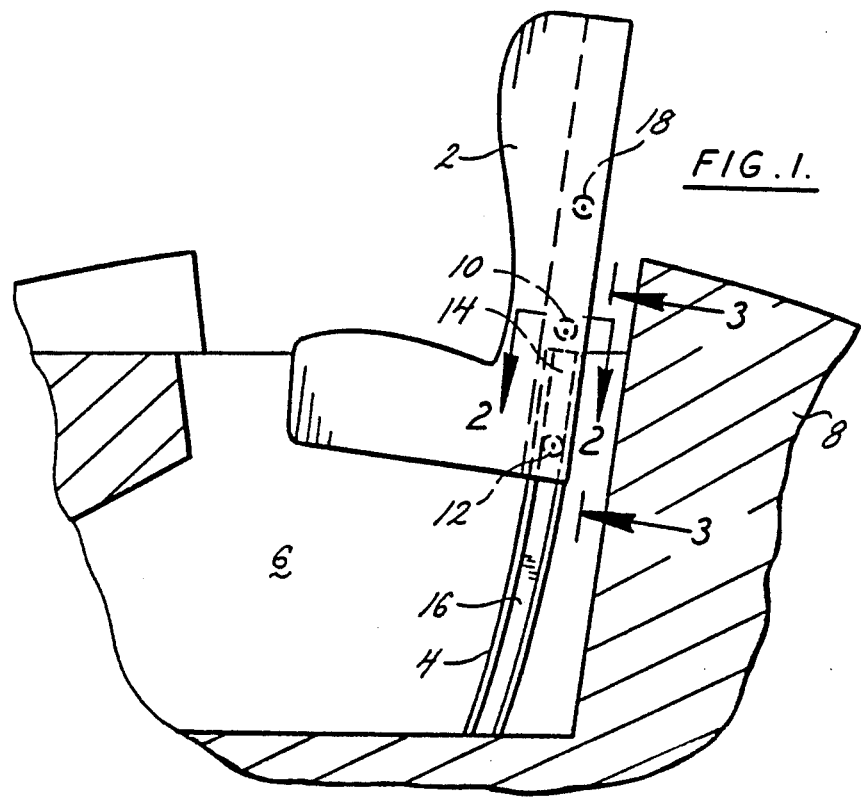
FIG. 1 is a side view of an ejection seat traveling up a rail constructed from an I-beam, wherein the seat rollers are releasing from the rail.

Referring to the drawings more particularly by reference numbers, FIG. 1 shows an ejection seat 2 traveling up a rail 4 which is mounted into the cockpit 6 of an aircraft 8. The ejection seat 2 can be any standard seat used in the aircraft industry such as the rocket catapult seat sold by McDonnell Douglas under the trademark ACES II. Attached to the side of the seat 2 are first 10 and second 12 guides that ride along and are constrained by first 14 and second 16 channels in the rail 4, respectively. To provide further stability a top guide 18 can be attached to the seat 2, the top guide 18 travels along the first channel 14. Another set of guides, channels and rail can be placed on the other side of the seat 2 and if desirable could also be located in the center of the seat 2. The guides should preferably be rollers, but any conventional guide means that can travel along the channels can be used.

Figure 2:
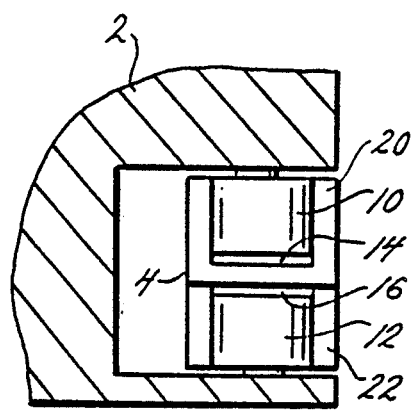
FIG. 2 is a cross-sectional view of FIG. 1 taken at line 2—2 showing the rollers within the first and second channels of the I-beam rail.

As shown in FIG. 2, the rail 4 can be constructed from an I-beam, wherein a first 20 set of flanges form the first channel 14 and a second 22 set of flanges form the second channel 16. The second flange set 22 is cut, such that the second channel 16 terminates at a distance x from the end of the first channel 14, the distance x approximately equaling the distance between the first guide 10 and the second guide 12, see FIG. 3. By terminating the channels at a distance equal to the space between the guides, the guides will disengage from the rail 4 at the same time. This simultaneous release of the guides allows the seat 2 to exit the cockpit 6 without any rail 4 induced aft pitch angle and seat rotation.

Figure 3:
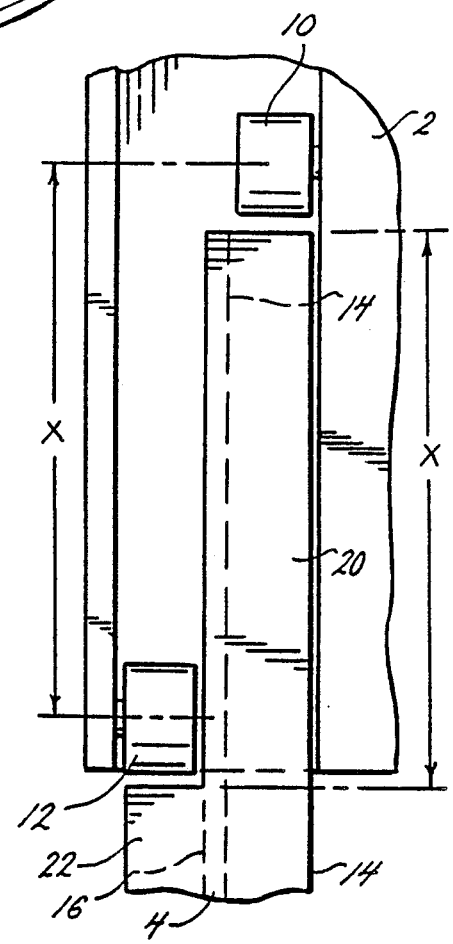
FIG. 3 is a cross-sectional view of FIG. 1 taken at line 3—3, showing the rollers of an ejection seat simultaneously releasing from the I-beam rail.

FIGS. 4, 5 and 6 show an alternative embodiment to the structure depicted in FIGS. 1-3. Instead of making the rail 4 out of an I-beam a stepped "C" channel is used. The C channel rail 24 has a set of flanges 26 that differ in width as they extend from the base 28 of the rail 24. The C rail 24 is constructed such that the flanges 26 are thicker near the base 28 of the rail 24. The lower part 30 of the flanges form a first channel 14' and the upper part 32 of the flanges form a second channel 16'. A first guide 10' or roller is attached to the seat 2 by a first pin 34. The first guide 10' travels along the first channel 14'. A second guide 12' is attached to the seat 2 by a second pin 36 and 20 travels along the second channel 16'. The second channel 16' terminates at a distance X from the end of the first channel 14', approximately equal to the distance between the bottom of the first guide 10' and the bottom of the second guide 12', such that the guides exit the channels simultaneously, see FIG. 6.

Figure 7:
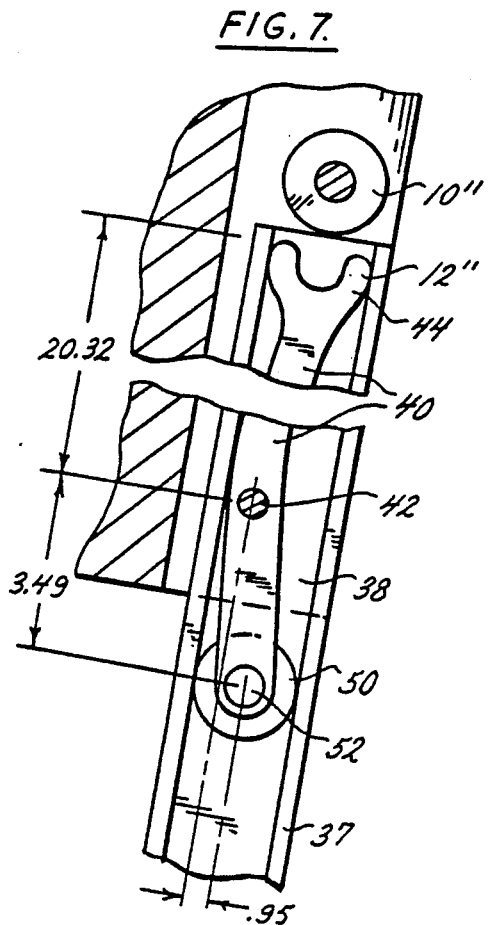
FIG. 7 is a simultaneous release mechanism utilizing a lever that is attached to the ejection seat.
Figure 8:
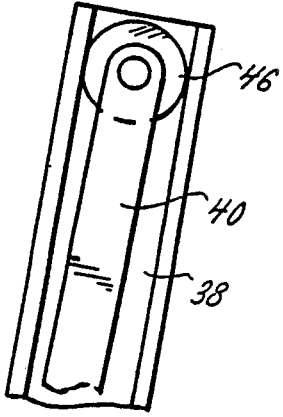
FIG. 8 is an alternative embodiment to the flange guide disclosed in FIG. 7.
Figure 9:
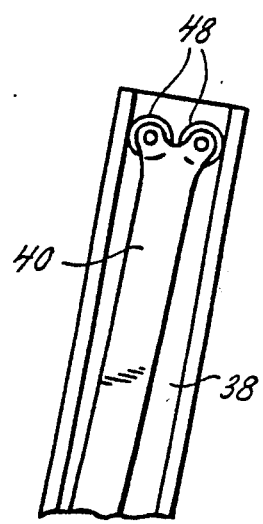
FIG. 9 is an alternative embodiment to the flange guide disclosed in FIG. 7.

Another rail/guide embodiment is shown in FIG. 7. The rail 37 has one single channel 38. A first guide 10" is attached to the seat 2 and travels along the single channel 38. A lever 40 is pivotally mounted to the seat 2 by attachment means such as a third pin 42. Extending from or attached to the lever 40 is a second guide 12", which could be a pair of guide flanges 44 as depicted in FIG. 7, or a roller 46 as shown in FIG. 8, or a pair of rollers 48 as shown in FIG. 9. A third guide 50 is pivotally attached to the lever 40 by attachment means such as a fourth pin 52. Both the second 12" and third 50 guides travel along the single channel 38. The second guide 12" is in close proximity to the first guide 10", so that the first 10" and second 12" guides exit the single channel 38 at approximately the same time.

Figure 10:
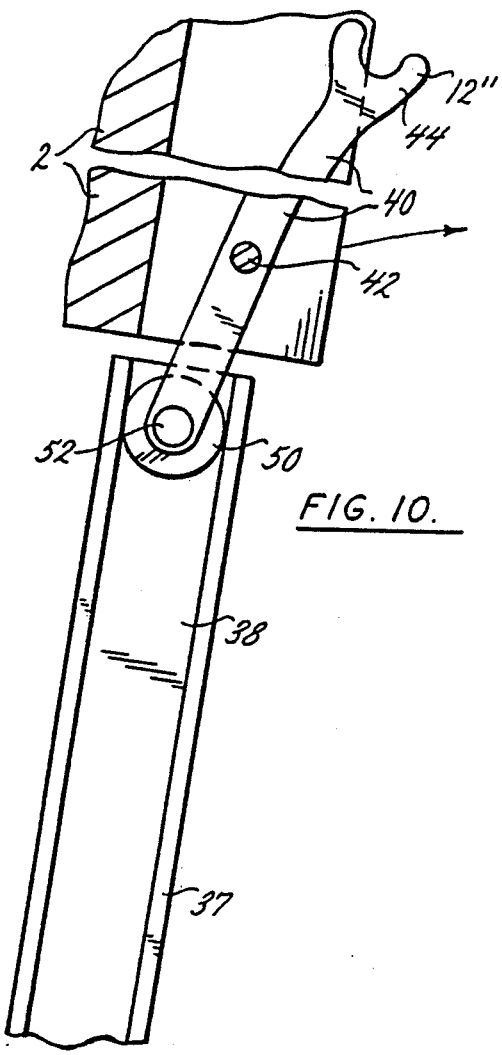
FIG. 10 is the lever release mechanism depicted in FIG. 7, wherein the flange guide has disengaged from the rail and the lever is allowed to freely move in the direction indicated by the arrow.

When the first and second guides are released, the lever 40 and the attached seat 2 are allowed to move in the direction as indicated in FIG. 10. Because the seat is attached to the lever 40 and the lever 40 is allowed to rotate about the third guide 50, the seat 2 is allowed to move freely without being restrained by the third guide 50. The first 12" and third 50 guides functionally release simultaneously, similar to the releasing mechanism shown in FIGS. 1-6. To prevent the seat 4 from being restrained between the time the second 12" and third 50 guides release, it is desirable to prevent contact between the lever 40 and the rail 37. To insure this, the geometric relationship between the lever 40, second guide 12", third guide 50 and channel 38, must be established to prevent the lever 40 from making contact with the rail 37, when the seat 2 is subjected to a predetermined windblast. For example, when the seat is to be subjected to a maximum windblast of 700 knots equivalent air speed (KEAS), and the width of the channel 38 is 4.445 cm., it has been calculated that the lever 40 will avoid channel contact, by using a lever no wider than 2.2 cm, and placing the third pin 42 approximately 0.95 cm 30 from the center of the channel 38 at a distance of 20.32 cm from the edge of the second guide 12" and 3.49 cm from the center of the third guide 50. By obtaining a simultaneous guide release with a single channel 38, this embodiment can be retrofitted into existing single channel rails that are found in most aircraft 8.

As the seat 2 nears the top of the rail 4, the windblast exerts a load on the seat 2, which is transmitted to the rail 4, causing the rail 4 to deflect. This causes the seat 2 to have a more aft pitch. To compensate for this rail deflection, the rail 4' can be curved toward the fore position as shown in FIG. 11. Thus when the rail 4' is deflected the rail 4' will bend toward a linear Position, which allows the seat 2 to exit from the cockpit 6 without rotational velocity, see FIG. 12. It has been calculated that for a maximum windblast of 700 KEAS, the rail 4 should have a radius of approximately 5° degrees. The curved rail concept can be used with or without any of the three simultaneous guide release mechanisms previously disclosed.

While certain exemplary embodiments of this invention have been described above and shown in the accompanying drawings, it is to be understood that such embodiments are merely illustrative of, and not restrictive on the broad invention. The invention is not to be limited by the specific constructions or arrangements shown and described, since various other modifications may occur to persons having ordinary skill in the art.

What is claimed is:

1. A structure that guides an ejection seat out of a vehicle, comprising:
    a) at least one first guide attached to said ejection seat at a predetermined point;
    b) at least one second guide attached to said ejection seat at a point which is lower than said predetermined point by a predetermined distance; and
    c) at least one rail attached to said vehicle, said rail having a first channel and a second channel, said first guide residing within said first channel and said second guide residing within said second channel, said first and second guides being adapted to travel along said first and second channels respectively, and to exit from said channels at the ends of said channels, the end of said first channel being at a distance from the end of said second channel approximately equal to the predetermined distance that separates said first and second guides, such that when said ejection seat travels along said rail, said first and second guides disengage from said first and second channels essentially simultaneously.

2. The structure as recited in claim 1 wherein said rail is an I-beam having a pair of first flanges defining said first channel and a pair of second flanges defining said second channel.

3. The structure as recited in claim 1 wherein said rail is a stepped "C" channel having a base and a pair of flanges, said flanges having a lower portion forming said first channel and an upper portion forming said second channel, said second channel being wider than said first channel.

4. The structure as recited in claim 1 wherein said first guide is a roller.

5. The structure as recited in claim 1 wherein said second guide is a roller.

6. The structure as recited in claim 2 wherein said first and second guides are rollers.

7. The structure as recited in claim 3 wherein said first and second guides are rollers.

8. The structure as recited in claim 1 wherein said rail has a curvature along the longitudinal axis of said rail.

9. The structure as recited in claim 8 wherein the curvature of said rail is approximately 5° degrees.

10. The structure as recited in claim 8 wherein said first and second guides are rollers.

11. A structure that guides an ejection seat out of a vehicle, comprising:
   a) at least one first guide attached to said ejection seat;
   b) at least one second guide attached to said ejection seat; and
   c) at least one rail attached to said vehicle, said rail having a single channel and having a predetermined curvature along the longitudinal axis of said rail when said ejection seat is at rest, said first and second guides residing in said single channel and being adapted to travel along said single channel and to exit from the end of said single channel.

12. The structure as recited in claim 11 wherein the predetermined curvature of said rail is approximately 5° degrees.

13. The structure as recited in claim 11, and further comprising:
   at least one lever, a first pivotal connection connecting said lever to said ejection seat;
   said second guide being attached to the upper end of said lever said second guide being located in close proximity to said first guide;
   at least one third guide, a second pivotal connection connecting said third guide to said lever, said second pivotal connection being located at the lower end of said lever,
   said third guide residing within said single channel and being adapted to travel along and exit said single channel;
   whereby when said first and second guides exit the top of said channel, said first and second pivotal connections permit said ejection seat complete freedom of motion, said seat not being constrained by said third guide even before said third guide exits the top of said channel.

14. The structure as recited in claim 13 wherein said second guide is a roller.

15. The structure as recited in claim 13 wherein said second guide is a pair of rollers.

16. The structure as recited in claim 13 wherein said second guide is a pair of flanges extending from said lever, said flanges being contiguous to said rail while said flanges reside within said single channel.

* * * * *